(12) United States Patent
Kelsey et al.

(10) Patent No.: US 7,055,006 B1
(45) Date of Patent: May 30, 2006

(54) SYSTEM AND METHOD FOR BLOCKING CACHE USE DURING DEBUGGING

(75) Inventors: James D. Kelsey, Erie, CO (US);
Sengan Baring-Gould, Ward, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 345 days.

(21) Appl. No.: 10/426,755

(22) Filed: Apr. 30, 2003

(51) Int. Cl.
*G06F 12/14* (2006.01)

(52) U.S. Cl. .................. 711/139; 711/138; 711/144; 711/145; 711/152; 714/30; 714/31; 714/37; 714/38

(58) Field of Classification Search ........... 711/138, 711/139, 144, 145, 152, 130; 714/37, 38, 714/30, 31
See application file for complete search history.

(56) References Cited

U.S. PATENT DOCUMENTS

| | | | | |
|---|---|---|---|---|
| 5,530,804 A | * | 6/1996 | Edgington et al. | 714/30 |
| 5,636,363 A | * | 6/1997 | Bourekas et al. | 711/138 |
| 6,314,530 B1 | * | 11/2001 | Mann | 714/38 |
| 6,397,382 B1 | * | 5/2002 | Dawson | 717/130 |
| 6,505,309 B1 | * | 1/2003 | Okabayashi et al. | 714/35 |
| 6,691,207 B1 | * | 2/2004 | Litt et al. | 711/108 |

* cited by examiner

*Primary Examiner*—T Nguyen

(57) ABSTRACT

A system includes at least one memory operable to store a first flag identifying whether a cache is disabled and a second flag identifying whether use of the cache is blocked. The system also includes combinatorial logic operable to use the first and second flags to determine whether the cache is used during execution of at least one instruction by a processor. The first flag identifies that the cache is enabled and the second flag identifies that the use of the cache is blocked when the processor is operating in a debugging mode.

19 Claims, 3 Drawing Sheets

SYSTEM AND METHOD FOR BLOCKING CACHE USE DURING DEBUGGING

TECHNICAL FIELD

This disclosure is generally directed to computer systems and more specifically to a system and method for blocking cache use during debugging.

BACKGROUND

Computer systems often support the execution of instructions in a debugging mode, which can be used to help debug applications. For example, in a typical debugging mode, the computer system monitors and logs communications between a central processing unit and an external memory. When the central processing unit reads data from or writes data to the external memory, the data and the address of the data may be logged. In this way, a user can later analyze the log and identify potential problems with an application.

A problem with this scheme on conventional computer systems is that a typical central processing unit includes one or more caches. These caches can store and facilitate retrieval of information without accessing the external memory. As a result, the use of the cache typically cannot be monitored during debugging. Also, applications or operating systems being executed by the central processing unit could be configured to use the external memory instead of the cache, but this often modifies the behavior of the applications or the operating systems. As a result, the information collected during debugging may not reflect the normal operation of the applications or the operating systems.

SUMMARY

This disclosure provides a system and method for blocking cache use during debugging.

In one embodiment, a system includes at least one memory operable to store a first flag identifying whether a cache is disabled and a second flag identifying whether use of the cache is blocked. The system also includes combinatorial logic operable to use the first and second flags to determine whether the cache is used during execution of at least one instruction by a processor. The first flag identifies that the cache is enabled and the second flag identifies that the use of the cache is blocked when the processor is operating in a debugging mode.

In another embodiment, a method includes setting a first flag to enable a cache during execution of at least one instruction by a processor. The method also includes setting a second flag to block use of the cache during the execution of the at least one instruction. In addition, the method includes executing the at least one instruction in a debugging mode. Information is at least one of read from and written to an external memory instead of the cache.

One or more technical features may be present according to various embodiments of this disclosure. Particular embodiments of this disclosure may exhibit none, some, or all of the following features depending on the implementation. For example, in one embodiment, a system for blocking the use of a cache during debugging is provided. In particular, the system can prevent the use of a cache during debugging. Because the cache is unavailable for use, a processing system uses an external memory while executing instructions, and the use of the external memory can be monitored during debugging. In this way, more information can be collected during the debugging.

Moreover, the system may block the use of the cache without modifying an application or operating system being executed. For example, the application or operating system could be executed normally, and the processing system handles using the external memory instead of the cache. In this way, the application or operating system does not know that the processing system is using the external memory instead of the cache to execute the application. This helps to reduce the need to modify the application or operating system, which leads to more accurate debugging of the application or operating system.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
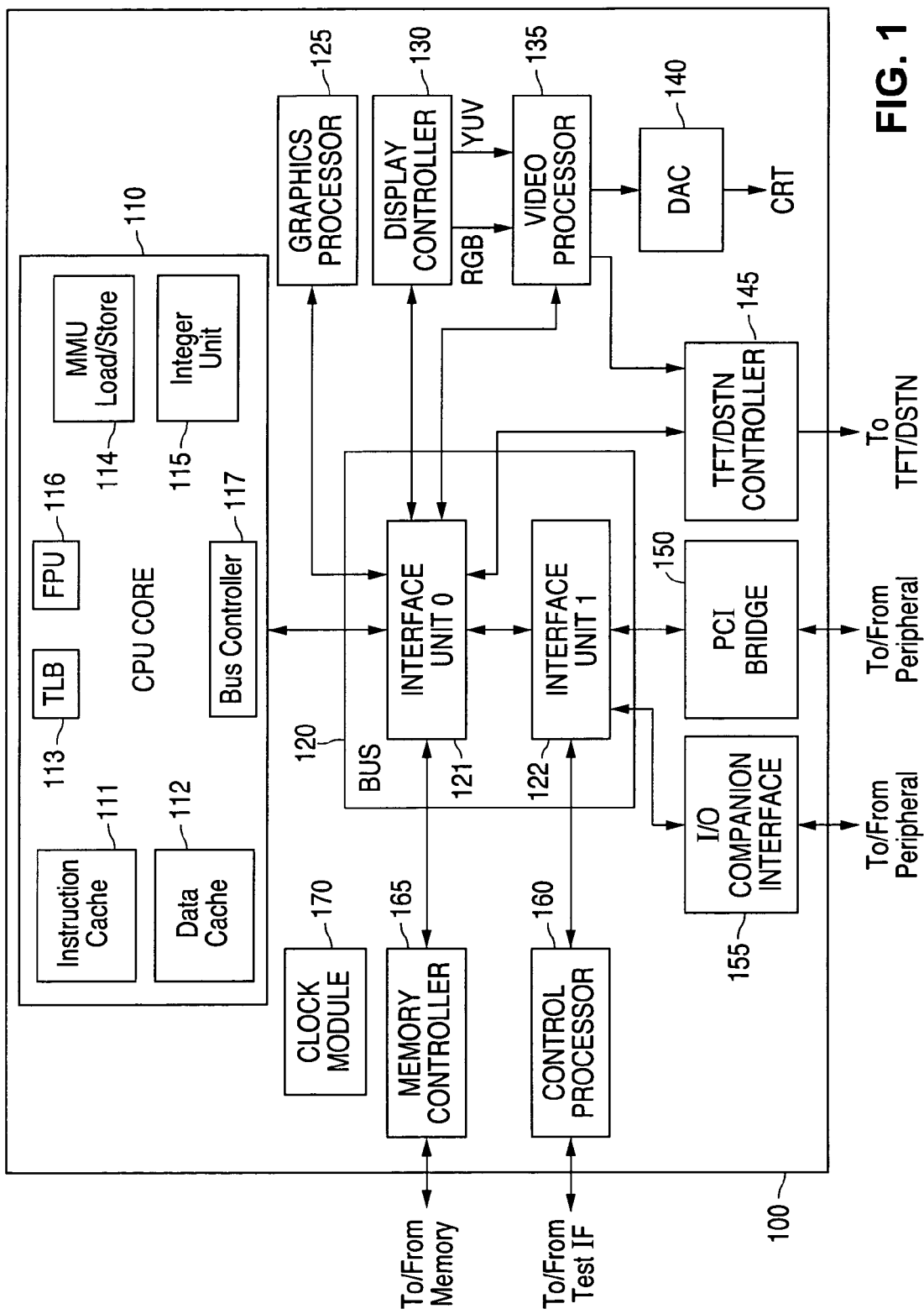
FIG. 1 is a block diagram of an example processing system according to one embodiment of this disclosure.

FIG. 1 is a block diagram of an example processing system 100 according to one embodiment of this disclosure. The processing system 100 illustrated in FIG. 1 is for illustration only. Other processing systems could be used without departing from the scope of this disclosure.

In one aspect of operation, the processing system 100 includes one or more caches 111, 112. The processing system 100 can execute instructions in a debugging mode, where data read from or written to an external memory is logged. To support the debugging functionality, the processing system 100 can block the use of the caches 111, 112. This helps to force the processing system 100 to use the external memory and prevent the use of the caches 111, 112 during debugging, which may increase the information collected during the debugging. Also, the processing system 100 may block the use of the caches 111, 112 without modifying an application or operating system being executed. This helps to reduce the need to modify the application or operating system during debugging.

In the illustrated example, the processing system 100 includes a central processing unit (CPU) core 110. The CPU core 110 executes instructions, such as integer instructions and floating point instructions. For example, the CPU core 110 could execute instructions contained in applications and an operating system executed by a host computer. In one embodiment, the processing system 100 represents an x86 compatible device. In a particular embodiment, the CPU core 110 executes instructions in a combination of instruction sets, such as the Intel Pentium, Intel Pentium Pro, AMD K6 3DNow!, AMD K7 3DNow!, AMD K7 MMX, and National Semiconductor GX1 instruction sets.

In this example, the CPU core 110 includes an instruction cache 111, a data cache 112, a translation look-aside buffer (TLB) 113, a memory management unit (MMU) load/store block 114, an integer unit 115, a floating point unit (FPU) 116, and a bus controller 117. The instruction cache 111 and the data cache 112 represent memories used to store and facilitate retrieval of information used by the CPU core 110. For example, the instruction cache 111 could store instructions that have been, are, or may be executed by the integer unit 115 or the FPU 116. The data cache 112 could store data being processed by the integer unit 115 or the FPU 116, such as operands in an arithmetic operation. The caches 111, 112 could represent any suitable memory device or combination of devices. In one embodiment, each cache 111, 112 represents sixteen kilobytes of memory space. In a particular embodiment, each cache 111, 112 represents a single-clock access, sixteen kilobyte, four-way set associative cache. While FIG. 1 illustrates two separate caches 111, 112, the caches 111, 112 could be combined into a single memory or further subdivided into additional memories. Also, the caches 111, 112 could store any other or additional information.

The TLB 113 and MMU 114 support the use of virtual memory addresses by the processing system 100. For example, the processing system 100 may allow applications and an operating system to use virtual addresses to store and retrieve instructions and data. When the application or operating system is executed, the MMU 114 may receive the virtual memory address and access the TLB 113. The TLB 113 includes a table identifying various virtual addresses and the physical addresses corresponding to those virtual addresses. Using the TLB 113, the MMU 114 converts the received virtual address into a physical memory address. The processing system 100 may then use the physical memory address to access a memory.

The integer unit 115 executes integer instructions. In one embodiment, the integer unit 115 includes a single-issue, eight-stage pipeline. In a particular embodiment, the integer pipeline includes an instruction prefetch stage, an instruction predecode stage, an instruction decode stage, an instruction queue stage, two address calculation stages, an execution stage, and a writeback stage.

In the instruction prefetch stage, raw instructions are fetched from the instruction cache 111. The instruction predecode stage extracts prefix bytes from the raw instruction bits. The predecode operation also looks-ahead to the next instruction and a potential bubble can be eliminated if the pipeline stalls downstream. The instruction decode stage performs a full decode of the instruction data and indicates the instruction length back to the prefetch stage, allowing the prefetch stage to shift the appropriate number of bytes to the beginning of the next instruction.

The instruction queue stage comprises a first in-first out (FIFO) queue containing decoded x86 instructions. The instruction queue allows the instruction decode stage to proceed even if the pipeline is stalled downstream. Register read operations for data operand address calculations are performed in the instruction queue stage. The first address calculation stage computes the linear address of operand data (if required) and issues requests to data cache 112. Microcode can take over the pipeline and inject a micro-box if multi-box instructions require additional data operands. In the second address calculation stage, operand data (if required) is returned and set up to the execution unit stage with no bubbles if there was a data cache hit. Segment limit checking also is performed on the data operand address. The micro-read-only-memory (μROM) is read for setup to the execution unit stage.

In the execution unit stage, register and/or data memory fetches are fed through an arithmetic logic unit (ALU) for arithmetic or logical operations. The μROM may fire for the first instruction box into the pipeline. Microcode may control the pipeline and insert additional boxes in the execution unit stage if the instruction requires multiple execution unit stages to complete. The writeback stage writes results of the execution unit stage to the register file or to data memory.

The FPU 116 executes floating point instructions. In one embodiment, the FPU 116 includes multiple pipelines, such as an execution pipeline and a load/store pipeline. Also, the FPU 116 can execute instructions in one or more instruction sets, such as the x87, MMX, and 3DNow! instruction sets. The FPU 116 could also support dynamic scheduling of instructions, which may help to reduce stalls in the pipelines of the FPU 116. The FPU 116 could further support out-of-order execution and register renaming. In addition, the FPU 116 could perform floating point operations in accordance with the IEEE 754 standard and support an instruction issue rate of one instruction per clock from the integer core. In a particular embodiment, the FPU 116 could have a data path that is optimized for single precision arithmetic, while extended precision arithmetic is handled by microcode and multiple passes through the pipelines of the FPU 116.

The bus controller 117 facilitates communication between the CPU core 110 and other components of the processing system 100. For example, when needed data is not available in the caches 111, 112, the bus controller 117 could support the transfer of the data from the external memory to the CPU core 110 over an internal bus 120.

The internal bus 120 facilitates communication between various components of the processing system 100. In this example, the bus 120 includes a first interface unit 121 and a second interface unit 122. The first interface unit 121 facilitates communication between higher-speed components of the processing system 100, while the second interface unit 122 facilitates communication between lower-speed components of the processing system 100. The interface units 121, 122 may also communicate with each other so that the higher-speed components and the lower-speed components may communicate. While FIG. 1 may illustrate a certain component of the processing system 100 as representing a "higher-speed" or "lower-speed" component, this is for illustration only. Each component could operate at any suitable speed.

A graphics processor 125 processes graphics data for display to a user. The graphics processor 125 could, for example, include a bit block transfer (bitBLT) engine, a raster operations (ROP) unit, and an alpha compositing unit. The bitBLT engine transforms blocks of pixels, such as by changing colors or shades of pixels or rotating a block of pixels. The ROP unit performs various raster operations on the graphics data, such as 256 standard raster operations. The alpha compositing unit supports transparency of the graphics data. The graphics processor 125 could further support pattern generation, source expansion, pattern/source transparency, and ternary raster operations.

A display controller 130 generates displays for presentation to a user, including displays using the graphics produced by the graphics processor 125. The display controller 130 may retrieve graphics, video, and overlay streams from a frame buffer, serialize the streams, and perform any color look-ups and output formatting. The display controller 130 may also interface with a display filter for driving a display device. The display controller 130 may include a graphical user interface (GUI) and a video graphics array (VGA), which provides full hardware compatibility with the VGA graphics standard. For example, the VGA may pass eight-bit pixels and sync signals to the GUI, which may expand the pixels to 24-bit color values using a color lookup table.

A video processor 135 receives graphics data, video data, or other information to be displayed. The video processor 135 then outputs digital data capable of being displayed to a user. For example, the video processor 135 could mix graphics and video streams and output digital red, green, and blue (RGB) data. The video processor 135 could be capable of delivering high resolution and true color graphics. The video processor 135 may also overlay or blend a scaled true color video image on the graphics background.

The output of the video processor 135 may be supplied to a digital to analog converter (DAC) 140 or a Thin Film Transistor/Double-Layer Supertwist Nematic (TFT/DLSN) controller 145. The DAC 140 converts the digital values from the video processor 135 into analog values for display on a cathode ray tube (CRT). The DAC 140 may, for example, represent a 3×8 bit DAC. The TFT/DLSN controller 145 uses the digital values from the video processor 135 to generate a digital output signal suitable for display on a flat-panel liquid crystal display (LCD). In a particular embodiment, the TFT/DSTN controller 145 may drive all standard flat panel monitors up to 1024×768 resolution.

A peripheral component interconnect (PCI) bridge 150 facilitates communication with an external PCI bus. For example, the PCI bridge 150 could support communication with a sound card, disk drive, or other device over the PCI bus. In one embodiment, the PCI bridge 150 includes read and write FIFO queues, an interface controller, and a PCI arbiter.

An input/output (I/O) companion interface 155 allows the processing system 100 to receive several signals that support functions such as resets, interrupts, and system power management.

A control processor 160 manages reset control, the macro clock, and debugging functions in the processing system 100. In one embodiment, the control processor 160 includes a JTAG interface and scan chain control logic. The control processor 160 also supports chip reset, which includes initial phase-locked loop (PLL) control and programming, and runtime power management macro-clock control. The JTAG support may include a TAP controller that is IEEE 1149.1 compliant. Control of the processing system 100 can be obtained through the JTAG interface into the TAP controller. Internal registers, including registers in the CPU core 110, may be accessed. In-circuit emulation (ICE) capabilities may be supported through the JTAG and TAP controller interface.

A memory controller 165 facilitates access to one or more external memories, such as one or more RAM modules. For example, various components of the processing system 100, such as the CPU core 110, graphics processor 125, display controller 130, and TFT/DSTN controller 145, may need to store or retrieve data from the external memory, and the memory controller 165 facilitates access to the external memory. In one embodiment, the memory controller 165 can facilitate access to both single data rate (SDR) and dual data rate (DDR) memory. Also, the memory controller 165 can facilitate access to any amount of external memory, such as one gigabyte of memory. In a particular embodiment, the memory controller 165 allows data used by the CPU core 110 and graphics data to be stored in the external memory, thereby supporting a unified memory architecture (UMA).

A clock module 170 generates clock signals used by the various components of the CPU 100. For example, the clock module 170 could generate signals used by the CPU core 110 to execute integer and floating point instructions.

In one aspect of operation, instructions to be executed by the processing system 100 could be stored in and retrieved from the instruction cache 111. Similarly, data used by the processing system 100 during the execution of the instructions could be stored in and retrieved from the data cache 112. The processing system 100 could further execute instructions in a debugging mode. For example, in the debugging mode, an external device such as a logic analyzer may log data read from or written to the external memory through the memory controller 165.

To facilitate the execution of the instructions in the debugging mode, the CPU core 110 blocks the use of one or more of the caches 111, 112. By blocking the use of the caches 111, 112, the CPU core 110 cannot store data in or retrieve data from the caches 111, 112. As a result, data is stored in or retrieved from the external memory through the memory controller 165. Because the data is stored in or retrieved from the external memory through the memory controller 165, the data is logged during debugging. Without the use of this feature, the data stored in or retrieved from the caches 111, 112 might not be logged because the data does not pass through the memory controller 165.

Also, the processing system 100 can block the use of the caches 111, 112, while an application or operating system being executed by the processing system 100 still believes that the caches 111, 112 are available for use. In this way, the behavior of the application or operating system need not be modified so as to prevent use of the caches 111, 112. As a result, the execution of the application or operating system is not modified by blocking the use of the caches 111, 112. Because the behavior of the application or operating system is not modified, the information collected during the debugging may be more accurate because it reflects the normal behavior of the application or operating system.

Although FIG. 1 illustrates one example of a processing system 100, various changes may be made to FIG. 1. For example, the cache-blocking mechanism can be implemented in any suitable processing system and is not limited to the processing system 100 illustrated in FIG. 1. Also, the functional division of the components in FIG. 1 is for illustration only. Various components can be combined or omitted and additional components can be added according to particular needs. In addition, each component illustrated in FIG. 1 may be implemented in any hardware, software, firmware, or combination thereof.

Figure 2:
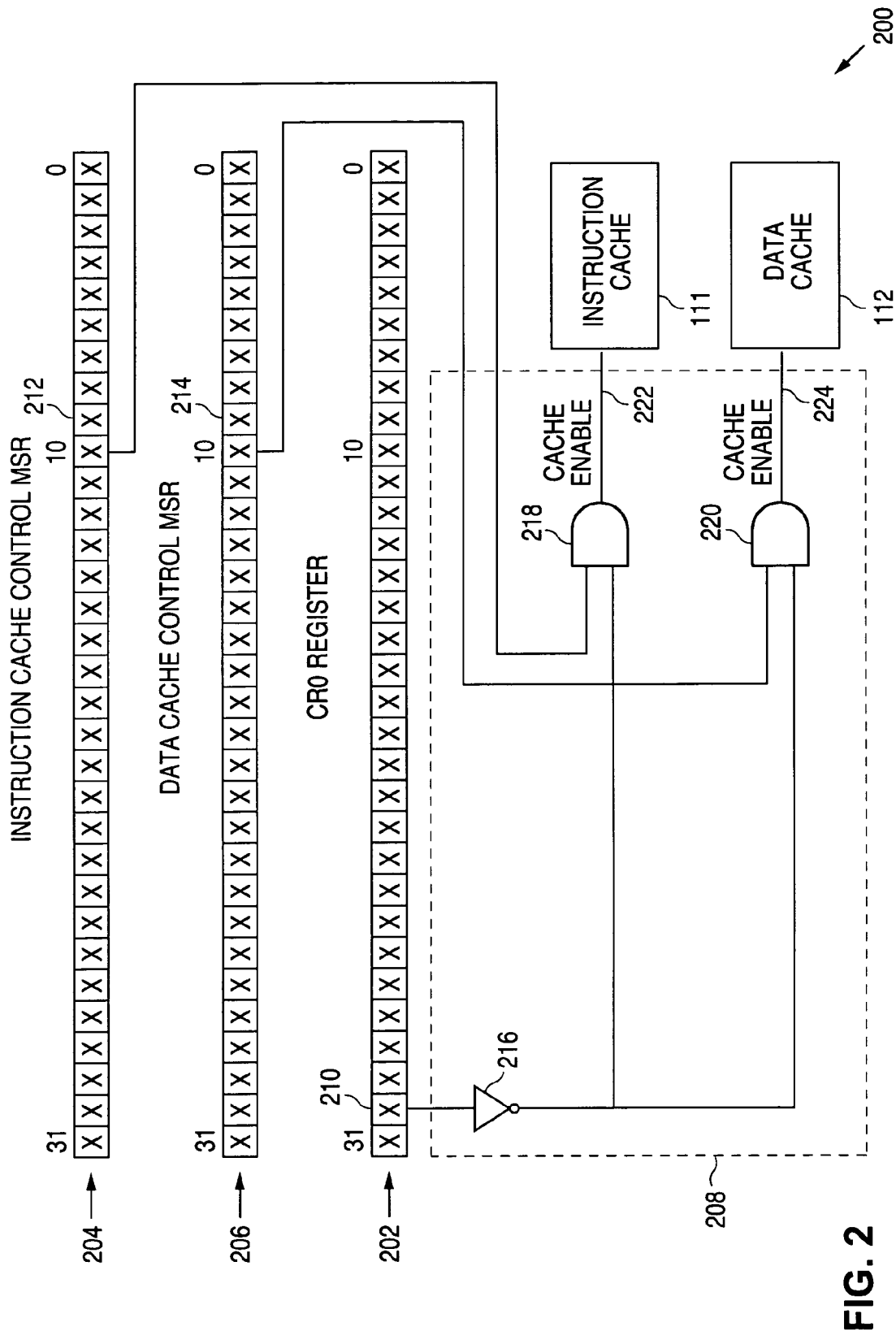
FIG. 2 is a block diagram of an example memory arrangement according to one embodiment of this disclosure.

FIG. 2 is a block diagram of an example memory arrangement 200 according to one embodiment of this disclosure. In the illustrated example, the memory arrangement 200 includes a control register 202, an instruction cache control machine state register (MSR) 204, a data cache control machine state register 206, and combinatorial logic 208. Other embodiments of the memory arrangement 200 may be used without departing from the scope of this disclosure. Also, while the memory arrangement 200 may be described with respect to the processing system 100 of FIG. 1, other processing systems could use the memory arrangement 200.

The control register 202 represents a register used to store control information used to control various aspects of the operation of the processing system 100. For example, a cache disable bit 210 (bit 30) indicates whether use of the caches 111, 112 is disabled. As particular examples, when the cache disable bit 210 has a value of "1", the caches 111, 112 are disabled and cannot be used. When the cache disable bit 210 has a value of "0", the caches 111, 112 are not disabled and are available for use.

The machine state registers 204, 206 store control information associated with the instruction cache 111 and the data cache 112, respectively. For example, a cache blocking bit 212, 214 in each of the machine state registers 204, 206 may identify whether access to the respective cache 111, 112 has been blocked. As a specific example, a value of "1" may indicate that the respective cache 111, 112 can be used, while a value of "0" may indicate that the respective cache 111, 112 is blocked and cannot be used.

The combinatorial logic 208 uses the values of the bits 210–214 in the registers 202–206 to determine whether access to the caches 111, 112 should be allowed. In the illustrated example, the combinatorial logic 208 includes an inverter 216 and two AND gates 218, 220. This illustrates one example of the combinatorial logic 208 that could be used to control access to the caches 111, 112. Other combination logic arrangements could be used without departing from the scope of this disclosure.

The inverter 216 inverts the value assigned to the cache disable bit 210 in the control register 202. Each of the AND gates 212, 214 performs a logical AND operation involving the value produced by the inverter 210 and the value assigned to the cache blocking bit 212, 214 in one of the machine state registers 204, 206. The results of the AND operations represent cache enable signals 222, 224, which identify whether the instruction cache 111 and the data cache 112 are available for use.

In this example, the caches 111, 112 can be disabled when the value of the cache disable bit 210 has a value of one. Even when the cache disable bit 210 has a value of zero, the use of a cache 111, 112 can be blocked when the cache blocking bit 212, 214 has a value of zero. During debugging, the cache disable bit 210 could be set to a value of zero (indicating that the caches 111, 112 are enabled) and the cache blocking bits 212, 214 can be set to a value of zero (indicating that the use of the caches 111, 112 is blocked). The application or operating system being executed by the processing system 100 may determine that the use of the caches 111, 112 is enabled using the cache disable bit 210 and execute accordingly. The application or operating system may be unaware that the cache blocking bits 212, 214 are set to a value of zero, which prevents the use of the caches 111, 112. As a result, the application or operating system executes as if the caches 111, 112 are available for use, while the processing system 100 is prevented from using the caches 111, 112 and uses the external memory instead. The processing system 100 therefore uses the external memory in a transparent manner from is the application or operating system's perspective, and the use of the external memory can be logged during debugging.

Although FIG. 2 illustrates one example of a memory arrangement 200, various changes may be made to FIG. 2. For example, other registers could store the values used by the combinatorial logic 208. Also, the values could be stored in other memories, rather than in registers 202–206. Further, while access to the caches 111, 112 has been described as being based on the values of various bits, other flags could be used to control access to the caches 111, 112. In addition, the memory arrangement 200 could be implemented in any suitable location in the processing system 100, such as in the CPU core 110.

Figure 3:
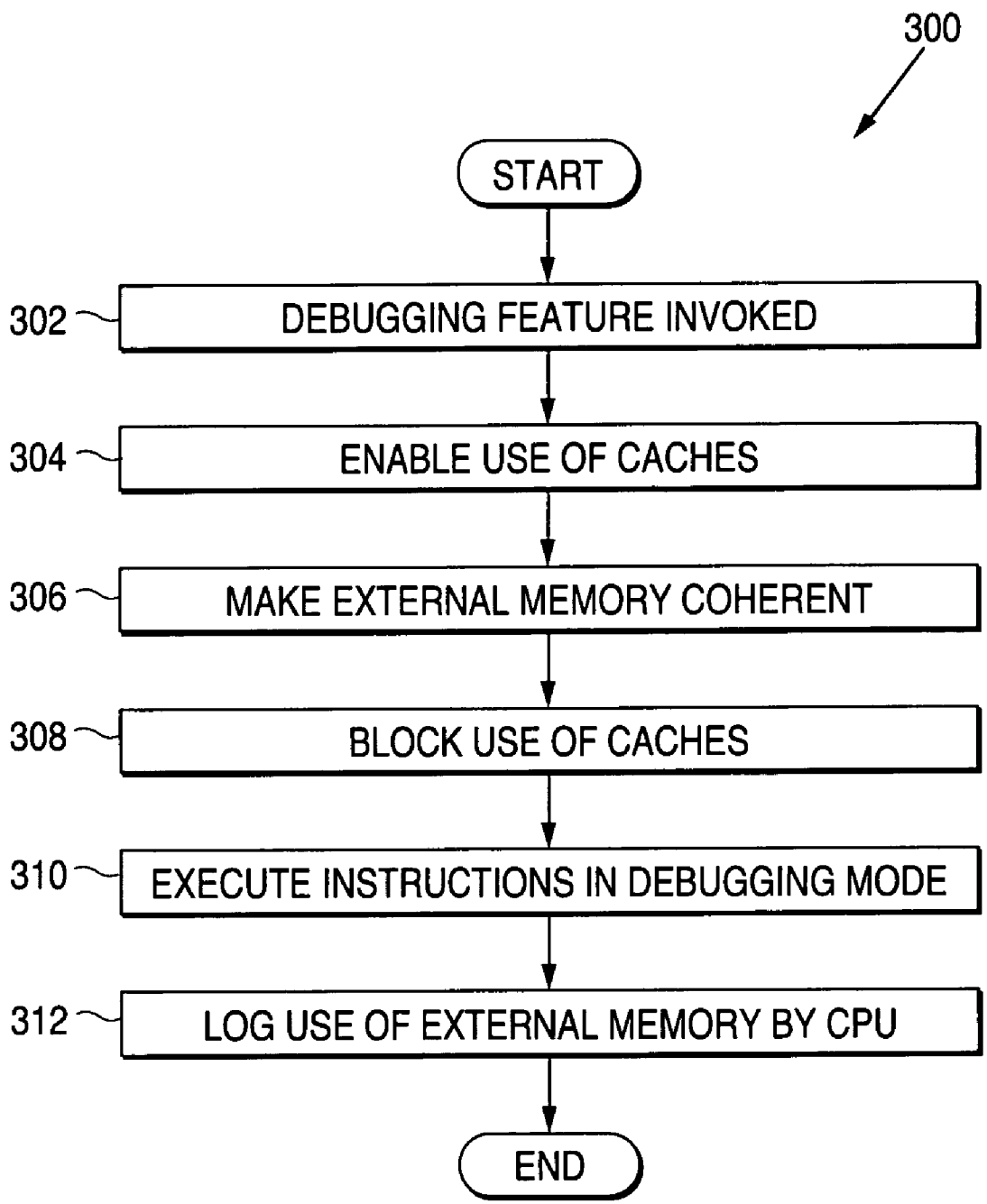
FIG. 3 is a flow diagram of an example method for blocking use of a cache during debugging according to one embodiment of this disclosure.

FIG. 3 is a flow diagram of an example method 300 for blocking use of a cache during debugging according to one embodiment of this disclosure. The method 300 may be described with respect to the processing system 100 of FIG. 1 using the memory arrangement 200 of FIG. 2. Other processing systems or memory arrangements could be used with method 300 without departing from the scope of this disclosure.

The processing system 100 activates or invokes a debugging feature at step 302. This may include, for example, setting suitable bits in registers in the processing system 100 to prepare to log use of an external memory. As part of this preparation, the processing system 100 enables use of one or more caches at step 304. This may include, for example, setting the cache disable bit 210 in the control register 202 to a value of zero.

The processing system 100 makes the external memory coherent at step 306. In one embodiment, the processing system 100 may retrieve data from the external memory, store the data in the caches 111, 112, and then modify the data in the caches 111, 112. The processing system 100 may later write the changed data back to the external memory. To keep the external memory coherent when the caches 111, 112 are disabled, the processing system 100 may write any "dirty" lines from the caches 111, 112 to the external memory. A dirty cache line represents a line in a cache 111, 112 containing data that has been changed since initially stored in the cache 111, 112. By writing these dirty cache lines back to the external memory when disabling the caches 111, 112, the external memory contains the modified data from the caches 111, 112.

The processing system 100 also blocks use of the one or more caches at step 308. This may include, for example, setting the cache blocking bits 212, 214 in the machine state registers 204, 206 to a value of zero. At this point, the caches 111, 112 are enabled from the perspective of an application or operating system being executed by the processing system 100, but use of the caches 111, 112 is blocked by the processing system 100.

The processing system 100 then executes one or more instructions in the debugging mode at step 310. This may include, for example, executing integer instructions in the integer unit 115 and floating point instructions in the floating point unit 116 of the CPU core 110. This may also include the CPU core 110 storing and retrieving instructions and data in an external memory through the memory controller 165 of the processing system 100.

The processing system 100 logs use of the external memory at step 312. This may include, for example, logging the data written to or retrieved from the external memory. This may also include logging the address or addresses of the data that is written to or retrieved from the external memory.

Although FIG. 3 illustrates one example of a method 300 for blocking use of a cache during debugging, various changes may be made to FIG. 3. For example, the order of the steps may be altered according to particular needs.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system, comprising:
   at least one memory operable to store a first flag identifying whether a cache is disabled and a second flag identifying whether use of the cache is blocked; and combinatorial logic operable to use the first and second flags to determine whether the cache is used during execution of at least one instruction by a processor, wherein the first flag identifies that the cache is enabled and the second flag identifies that the use of the cache is blocked when the processor is operating in a debugging mode.

2. The system of claim 1, wherein:

the cache comprises a first cache;

the at least one memory is further operable to store a third flag identifying whether use of a second cache is blocked; and the combinatorial logic is further operable to use the first and third flags to determine whether the second cache is used during the execution of the at least one instruction.

3. The system of claim 2, wherein the combinatorial logic comprises:

an inverter operable to invert a value of the first flag;

a first AND gate operable to perform a logical AND operation involving the inverted value of the first flag and a value of the second flag to generate a first cache enable signal; and a second AND gate operable to perform a logical AND operation involving the inverted value of the first flag and a value of the third flag to generate a second cache enable signal.

4. The system of claim 1, wherein the at least one memory comprises a first register operable to store the first flag and a second register operable to store the second flag.

5. The system of claim 1, wherein the cache comprises one of an instruction cache and a data cache.

6. The system of claim 1, wherein the combinatorial logic is located in a core of the processor.

7. A processor, comprising:

an integer unit operable to execute integer instructions;

a floating point unit operable to execute floating point instructions;

a cache operable to store at least one of instructions to be executed and data used during execution of the instructions;

at least one memory operable to store a first flag identifying whether the cache is disabled and a second flag identifying whether use of the cache is blocked; and combinatorial logic operable to use the first and second flags to determine whether the cache is used during execution of at least one of the instructions, wherein the first flag identifies that the cache is enabled and the second flag identifies that the use of the cache is blocked during execution of the at least one instruction in a debugging mode.

8. The processor of claim 7, wherein:

the cache comprises a first cache;

the processor further comprises a second cache;

a third flag identifies whether use of the second cache is blocked; and the combinatorial logic is further operable to use the first and third flags to determine whether the second cache is used during the execution of the at least one instruction.

9. The processor of claim 8, wherein the combinatorial logic uses the first, second, and third flags to generate a first cache enable signal and a second cache enable signal, each cache enable signal identifying whether one of the caches can be used during the execution of the at least one instruction.

10. The processor of claim 9, wherein the combinatorial logic comprises:

an inverter operable to invert a value of the first flag;

a first AND gate operable to perform a logical AND operation involving the inverted value of the first flag and a value of the second flag and to generate the first cache enable signal; and a second AND gate operable to perform a logical AND operation involving the inverted value of the first flag and a value of the third flag and to generate the second cache enable signal.

11. The processor of claim 7, wherein the at least one memory comprises a first register operable to store the first flag and a second register operable to store the second flag.

12. The processor of claim 7, wherein the cache comprises one of an instruction cache and a data cache.

13. The processor of claim 7, wherein the processor accesses an external memory when use of the cache is blocked.

14. The processor of claim 13, wherein the external memory comprises a random access memory.

15. A method, comprising:

setting a first flag to enable a cache during execution of at least one instruction by a processor;

setting a second flag to block use of the cache during the execution of the at least one instruction;

determining whether access to the cache is blocked during the execution of the at least one instruction using the first and second flags; and executing the at least one instruction in a debugging mode, wherein information is at least one of read from and written to an external memory instead of the cache.

16. The method of claim 15, wherein determining whether access to the cache is blocked comprises:

inverting a value of the first flag; and logically ANDing the inverted value of the first flag and a value of the second flag.

17. The method of claim 15, wherein the cache comprises one of an instruction cache and a data cache.

18. The method of claim 15, wherein the external memory comprises at least one of a random access memory and a hard drive.

19. The method of claim 15, wherein setting the first and second flags comprises:

setting a cache disable bit in a first register; and setting a cache blocking bit in a second register.

* * * * *